(12) United States Patent
Cacciotto (10) Patent No.: US 8,436,599 B2
(45) Date of Patent: May 7, 2013

(54) CURRENT MODE DIGITAL CONTROL OF THE OUTPUT VOLTAGE OF A SWITCHING POWER SUPPLY

(75) Inventor: Fabio Cacciotto, Messina (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 254 days.

(21) Appl. No.: 12/954,064

(22) Filed: Nov. 24, 2010

(65) Prior Publication Data

US 2011/0122660 A1   May 26, 2011

(30) Foreign Application Priority Data

Nov. 26, 2009 (IT) .................. VA2009A0074

(51) Int. Cl.
*H02M 3/335* (2006.01)
*G05F 1/46* (2006.01)

(52) U.S. Cl.
USPC ................ 323/283; 363/21.05; 363/21.13

(58) Field of Classification Search .......... 323/283; 363/21.05, 21.13
See application file for complete search history.

(56) References Cited

U.S. PATENT DOCUMENTS

| | | | | |
|---|---|---|---|---|
| 6,005,377 A * | 12/1999 | Chen et al. | ...................... | 323/283 |
| 6,023,190 A | 2/2000 | Wada | ............................. | 327/540 |
| 6,992,468 B2 * | 1/2006 | Kranz | ............................. | 323/283 |
| 7,498,786 B2 * | 3/2009 | Prinz et al. | ...................... | 323/283 |
| 7,548,047 B1 | 6/2009 | Dasgupta et al. | .............. | 323/283 |
| 7,558,093 B1 | 7/2009 | Zheng | ............................. | 363/97 |
| 7,724,547 B1 * | 5/2010 | Zheng et al. | ................ | 363/21.13 |
| 8,022,685 B2 * | 9/2011 | Singh et al. | ..................... | 323/314 |
| 2003/0111989 A1 | 6/2003 | Kranz | ............................. | 323/283 |
| 2007/0236189 A1 | 10/2007 | Chung | ............................ | 323/243 |
| 2008/0112193 A1 | 5/2008 | Yan et al. | ..................... | 363/21.08 |
| 2009/0160422 A1 | 6/2009 | Isobe et al. | ..................... | 323/349 |

* cited by examiner

*Primary Examiner* — Gary L Laxton
(74) *Attorney, Agent, or Firm* — Allen, Dyer, Doppelt, Milbrath & Gilchrist, P.A.

(57) ABSTRACT

A method of controlling an output voltage of a pulse width modulation (PWM) converter with a PWM signal driving a power switch of the converter may include using a comparator to compare a reference voltage with a scaled output voltage of the converter, incrementing or decrementing an up/down counter at each pulse of a clock signal applied to the counter depending on a state of the comparator, and controlling the comparator to generate the PWM signal with a control voltage selected from a look-up table using a value of the counter.

14 Claims, 9 Drawing Sheets

CURRENT MODE DIGITAL CONTROL OF THE OUTPUT VOLTAGE OF A SWITCHING POWER SUPPLY

FIELD OF THE INVENTION

This present disclosure relates to switching power supplies and, in particular, to control circuits of converters used in switched-mode power supplies for regulating the output of the power supply.

BACKGROUND OF THE INVENTION

Figure 1:
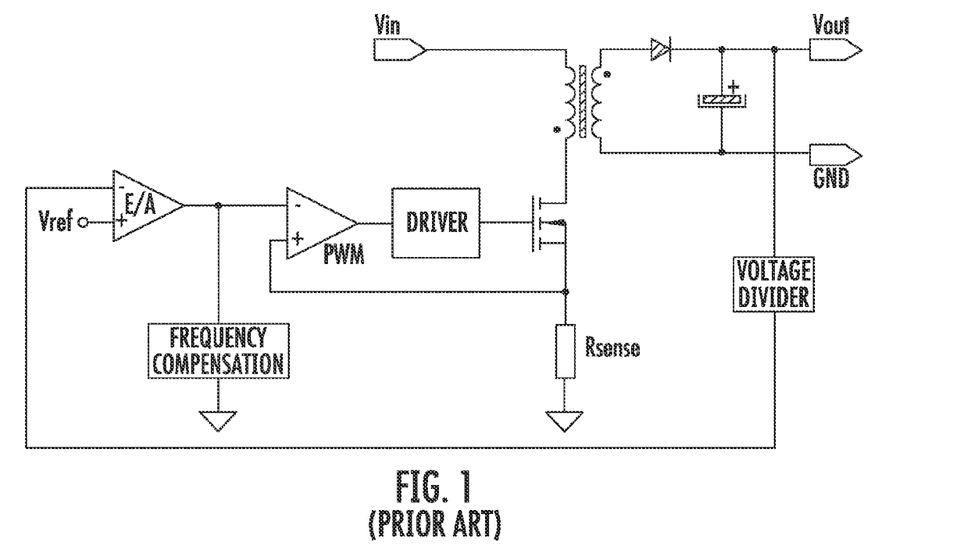
FIG. 1 is a block diagram of a current mode control circuit, according to the prior art.

In converters, the output voltage should remain constant even in the presence of fluctuations of the input voltage, the load, and the parameters, such as temperature and spread of the values of components. This has been achieved by using a closed loop regulation technique. Current mode control is very commonly used, and a typical implementation block diagram is shown in FIG. 1. The output voltage of the converter, or more often a scaled fraction thereof, is compared with a reference value VREF, and the difference is amplified by an error amplifier E/A.

The amplified signal is compared with information coming from the current sensing resistor RSENSE and is processed by an appropriate driver. With this technique, the drain current is controlled during every PWM cycle and its amplitude is modulated by the control loop in order to keep the output voltage constant. Numerous commercially available controllers use the circuit of FIG. 1, which allows for integration of the blocks E/A, PWM and the control logic of the power switch of the converter. Notably, an external compensation network realized with a resistor and a capacitor or with a combination thereof may be externally connected to the output of the error amplifier. Moreover, for realizing the error amplifier E/A, a relatively large silicon area is used, besides using bias currents and associated circuits.

Figure 2:
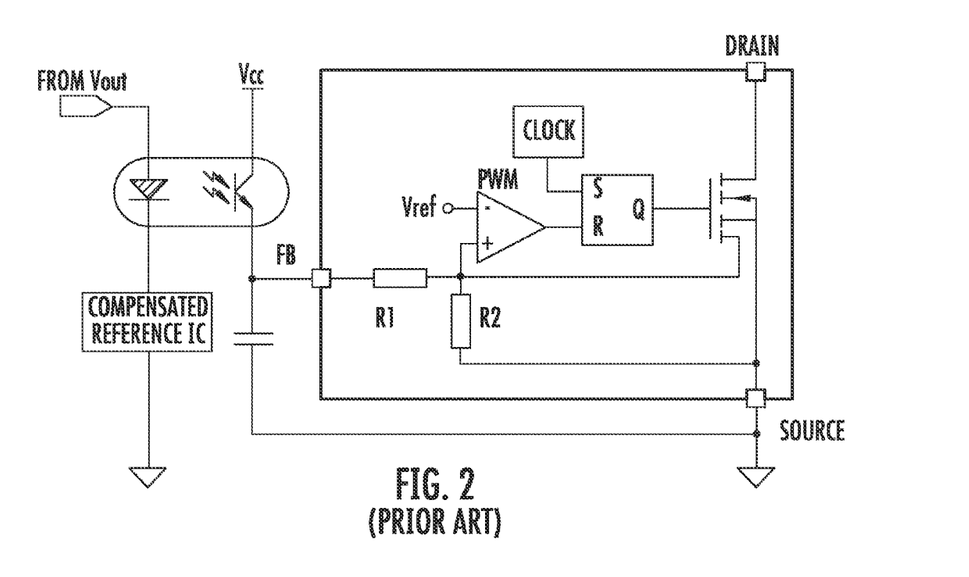
FIG. 2 depicts the control scheme of devices, according to the prior art.

There are other ways of exploiting the advantages of current mode control without using an error amplifier. This is the case of the controller implemented in the family of commercial devices VIPerX2, as available from the present application's assignee, STMicroelectronics of Geneva, Switzerland, which is depicted in FIG. 2. The clamp current is proportional to the current input through the control pin FB according to a typical control law. This approach may imply the need of a voltage reference (TL431, a shunt regulator referred to 2.5V or a Zener diode) in order to fix the output voltage. Moreover, the FB pin may be properly controlled in current mode through a photo-coupler in insulated applications, and in non-insulated topologies, the regulation may be done by connecting a Zener diode in the feedback path to the pin FB.

Figure 3:
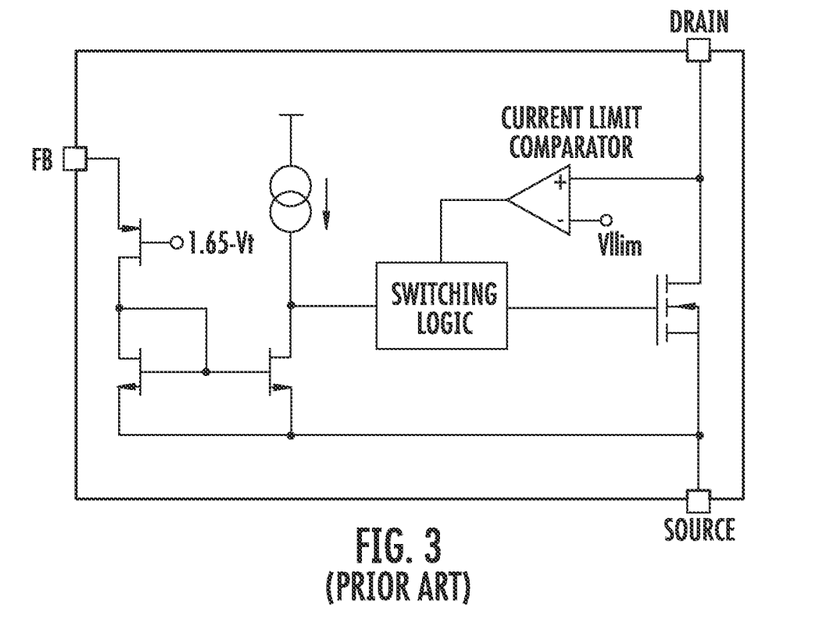
FIG. 3 depicts the current control scheme of devices of the series LinkSwitch-TN of Power Integrations, according to the prior art.

The use of a voltage reference and of a photo-coupler implies a significant cost, and the alternative embodiment of using a bipolar Zener diode may make the system less precise because of a significantly larger tolerance of the reference and of "spread" of parameters in function of temperature (that may only partially be nullified by realizing specific compensation circuits). Another approach may include using a simple ON-OFF control, as implemented in the devices of the family LinkSwitch-TN of Power Integration, which is schematically illustrated in FIG. 3.

In this case, the FB pin is the output of a low impedance circuit at 1.65V connected as a source follower. At the beginning of each switching cycle, if the current input to the pin is smaller than a certain value, for example, 49 µA, the control logic may enable the driver, and the consequent switching cycle may take place. Vice versa, if the current is greater than the threshold, the control logic disables the driver, and the switching cycle may be omitted. This technique may make the controller extremely simple to use and intrinsically stable, besides ensuring a very good response to transients. However, because the switching cycle starts always at the maximum clamp current, even at very small loads only when the average switching frequency varies, the system is not suitable for flyback converters, because acoustic noise may be generated on the transformer at low output load conditions.

SUMMARY OF THE INVENTION

An object is to provide a control method that may address the above noted issues, inefficiencies and limitations of typical circuits, freeing the designer from providing an external reference voltage and an error amplifier (E/A) while allowing precise regulation of the output voltage in a simple manner using a reduced number of external components. Moreover, the technique of this disclosure may modulate the clamp current in function of the load, and therefore be usable even in flyback converters without causing any acoustic noise on the transformer. Another object is to make the circuit easily realizable within a commonly integrated control circuit.

This technique may be based on the idea of dividing the whole range of the clamp current into a sequence of incremental values or steps. For a given output load, the correct value of clamp current may be implemented by successive approximations, tracking step-by-step the steady state value. Once the equilibrium value is reached, the drain current of the power switch of the converter may oscillate about this value. If the number of incremental steps of division of the whole current range is sufficiently large, the ripple due to these oscillations superposed to the ripple of the switching frequency of the converter may be negligible.

This technique may be used both in "off-line" converters (converters powered by the mains) in all its most common insulated or non-insulated circuit topologies (flyback, buck, buck-boost, etc.) as well as for controlling any type of DC-DC converter. Of practical interest may be the possibility of exploiting the control circuit for executing the soft start function of the converter, as well as for externally adjusting the maximum clamp current.

DETAILED DESCRIPTION OF THE PREFERRED EMBODIMENTS

Exemplary embodiments of the claimed invention are described referring to the attached drawings. Schemes and incremental numbers used for practicing the invention may be different and may be chosen by the designer depending on preferences and specific needs of the envisaged application. Therefore, this invention is not limited to the exemplary embodiments herein illustrated and described.

Figure 4:
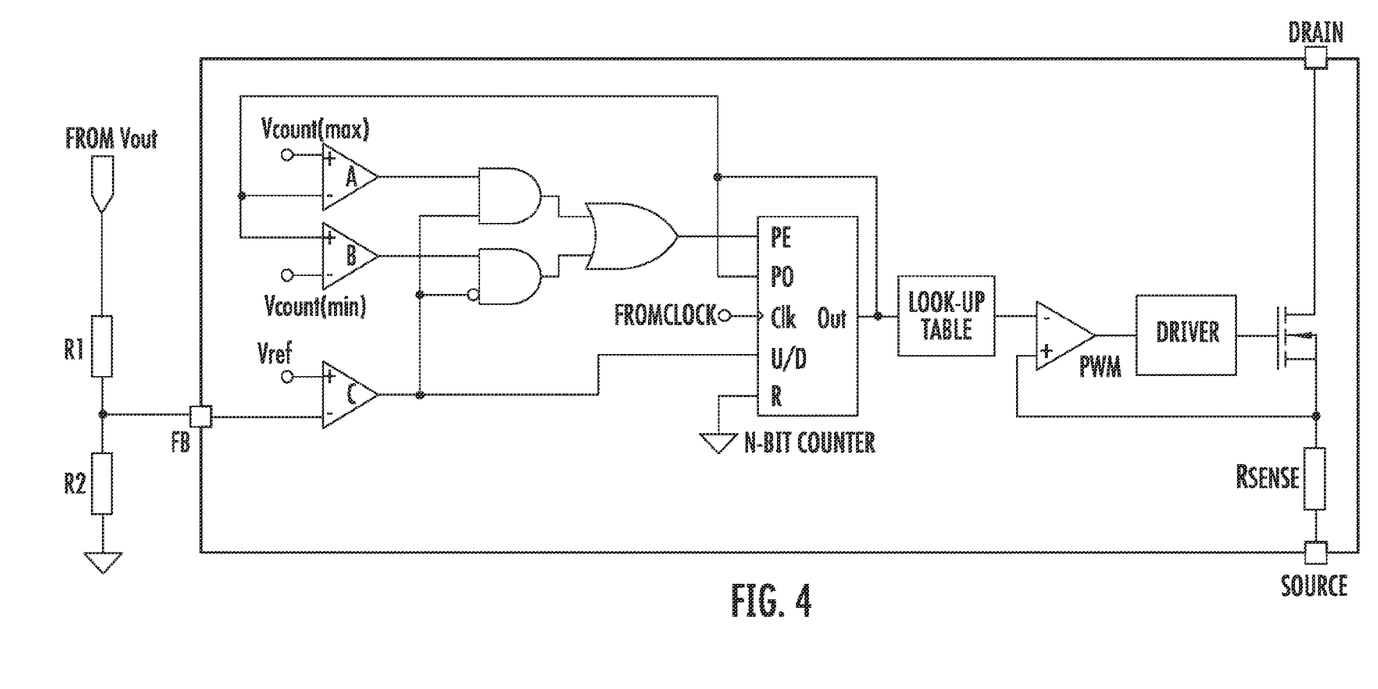
FIG. 4 is a basic circuit embodiment that implements the method of controlling a current, according to the present invention.

An exemplary high level block diagram that shows a possible circuit implementation of the control method in current mode is shown in FIG. 4. Basically, the device comprises: 1) an input comparator C, the non inverting pin of which is connected to a constant reference voltage VREF, and the other pin is externally connectable; 2) a N-bit up/down counter (N-bit counter) the output of which is incremented or decremented by one unit depending on the output state of the comparator C at each leading edge of the clock signal CK applied to the counter through the same name input; the input R resets the counter when its value is set to a logic 1; the input Up/Down makes the output of the counter decrement by one unit at each clock edge when its value is at a logic 0, instead when its state is at a logic 1, the counter is incremented by one unit at each clock edge; finally the inputs PE and PO allow fixing of the counting of the counter to the value assumed by the pin PO when the pin PE is in a logically high state (1); 3) a circuit (look-up Table) substantially comprising a look-up table containing data in correspondence between them of pre-established values of counting of the counter and of correspondent voltage values on an inverting input of a PWM comparator of the converter, and having a selection input connected to an output (Out) of the counter (N-bit counter) and an output connected to an input of the comparator (PWM) that generates the PWM signal, for applying to it a control voltage of the modulation corresponding to the selected value from the counting value of the counter (N-bit counter) in the look-up table.

The value of the applied voltage corresponds to a predetermined clamp current value, in other words, the table provides a correspondence between the counting at the output of the counter and the current value of the drain of the power switch of the converter, that when it is reached the switch is turned off. For sake of non-limitative example, a possible correspondence table is shown in the following Table 1.

| Counter output $n_{COUNT}$ | $I_{DRAIN}$ (mA) |
|---|---|
| 1 | 12.5 |
| 2 | 25 |
| 3 | 37.5 |
| 4 | 50 |
| 5 | 62.5 |
| 6 | 75 |
| 7 | 87.5 |
| 8 | 100 |
| 9 | 112.5 |
| 10 | 125 |
| 11 | 137.5 |
| 12 | 150 |
| 13 | 162.5 |
| 14 | 175 |
| 15 | 187.5 |
| 16 | 200 |
| 17 | 212.5 |
| 18 | 225 |
| 19 | 237.5 |
| 20 | 250 |
| 21 | 262.5 |
| 22 | 275 |
| 23 | 287.5 |
| 24 | 300 |
| 25 | 312.5 |
| 26 | 325 |
| 27 | 337.5 |
| 28 | 350 |
| 29 | 362.5 |
| 30 | 375 |
| 31 | 387.5 |
| 32 | 400 |

Figure 5:
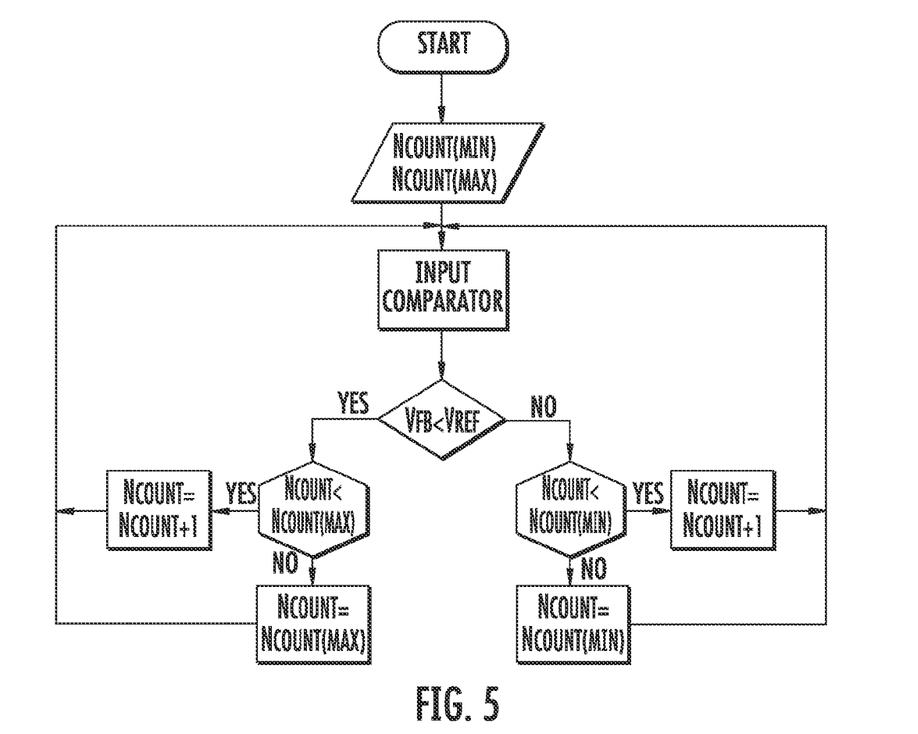
FIG. 5 is a flow chart that illustrates the current control method, according to the present invention.

The look-up table may be implemented using any storage device among the devices commonly used for this kind of functions. The flow chart of FIG. 5 illustrates the control algorithm according to the method that is implemented in a basic form by the circuit of FIG. 4.

First, the values NCOUNT(MIN) and NCOUNT(MAX) may be defined. NCOUNT(MIN) fixes the minimum clamp current, that is the current value below which a controller enables the burst mode function, and NCOUNT(MAX) defines the maximum clamp value. It is worth noting that, in the proposed example, the values are internally fixed by the voltages VCOUNT(MIN) and VCOUNT(MAX), respectively, but nothing hinders the possibility of externally fixing these values, such to allow an external user to set the thresholds independently.

The input comparator C compares the output voltage or a portion thereof with an internal reference Vref. The resistive voltage divider R1-R2 may be designed such to have, at the desired output voltage, the value Vref on the pin B. The output of the comparator C controls the Up/Down comparator of the N-bit counter. Considering the correspondence previously shown in Table 1, at each PWM cycle, if Vfb<Vref, the counter is incremented by a unit in respect to the previous value and the limiting current may consequently increase.

The clamp current of the drain of the power transistor of the converter may continue to be incremented, step-by-step, as far as Vout is smaller than the value set by the resistive voltage divider R1-R2. When Vout is larger than the steady-state value, Vfb>Vref, the counter is decremented by a unit in respect to the previous value and the clamp current is decreased.

In steady-state conditions, the system may function in the neighborhood of a steady-state functioning condition, and the clamp current of the maximum drain current of the power transistor may oscillate, cycle-by-cycle, between contiguous values inside the table. This phenomenon is well known in literature as a "limit cycle." If the number of current steps is sufficiently great, the residual ripple on the Vout due to this phenomenon is completely negligible and such to not jeopardize the overall stability of the system.

The value of N is to be chosen as a compromise between the need of having a small residual ripple due to the limit cycle, that uses high values of N, and the need of ensuring a speedy response to transients due to load variations, for which a small value of N is used. It is to be noted that the steady-state condition may be obtained by successive approximations, without the need of any dedicated circuitry that fixes a correspondence between an the error signal and the clamp current, as instead it may be necessary with the control methods of typical devices of FIG. 1 and FIG. 2. Moreover, differently from the technique of FIG. 3, the system may allow for adaptation to the steady-state clamp current to the real needs of the electric load of the supply, thus eliminating any problem of acoustic noise on the transformer, in the case of flyback applications.

This present disclosure optionally allows easy management of the functioning in small load conditions. In order to achieve this, it is sufficient to limit from below the counter to a minimum counting value, adjustable through the voltage VCOUNT_min. For sake of example, referring to Table 1, let us suppose of clamping the minimum drain current at 87.5 mA, if Vfb>Vref and the counter is at the level NCOUNT=7, the switching cycle may be skipped. As a consequence, the mean switching frequency may decrease and the system may enter in a "burst mode". The normal functioning conditions may be restored as soon as the input comparator may impose an inversion of the counting, determined by the condition Vfb<Vref. Besides the lower bound, it also may be necessary to contemplate an upper bound of the counting, such to prevent that, if NCOUNT=2N, a successive command for incrementing the counting, may restart the counter from VCOUNT_min.

A possible implementation of this bounding, shown as an example in FIG. 4, exploits the comparators A and B and the logic circuitry downstream thereof, that allows to act on the preset pin (PE) of the counter. Another useful function of the upper bounding block of the counting may be limiting externally the maximum clamp current to a value smaller than the default value. It is sufficient to make externally available the voltage VCOUNT_max, directly or indirectly (for example, through a resistor the value of which corresponds to the internal voltage). It is thus possible to obtain an extremely precise clamp, virtually depending only on the accuracy of the external reference.

The proposed system may be used also for generating the "soft start" function. Indeed, in this phase, it is sufficient to keep the system with the same current step for a mode more than one switching cycle. Clearly, the system should be capable of leaving this phase as soon as the PWM comparator may impose an inversion of the counting (caused by the reaching of the output steady-state condition of the converter), restarting to function again according to the previously proposed basic scheme.

A possible drawback of this basic embodiment may be caused by the fact that the steady-state functioning condition is reached by successive approximations and by checking the look-up table until the desired value is found and during abrupt load variations and/or at the start up, the system could generate "overshoots" or "undershoots" on the output voltage. In order to obviate this drawback, it is possible to add a simple control logic controlling the system during these critical functioning conditions.

In particular, during the start-up of the power supply and during phases in which the output load decreases, the logic circuitry disables the driver as soon as the voltage on the pin FB (fraction of the voltage Vout) surpasses the reference Vref by a percentage definable in an arbitrary fashion and in function of the output overshoot that is considered acceptable, for example a predefined value in a design phase VREF_H.

Figure 6:
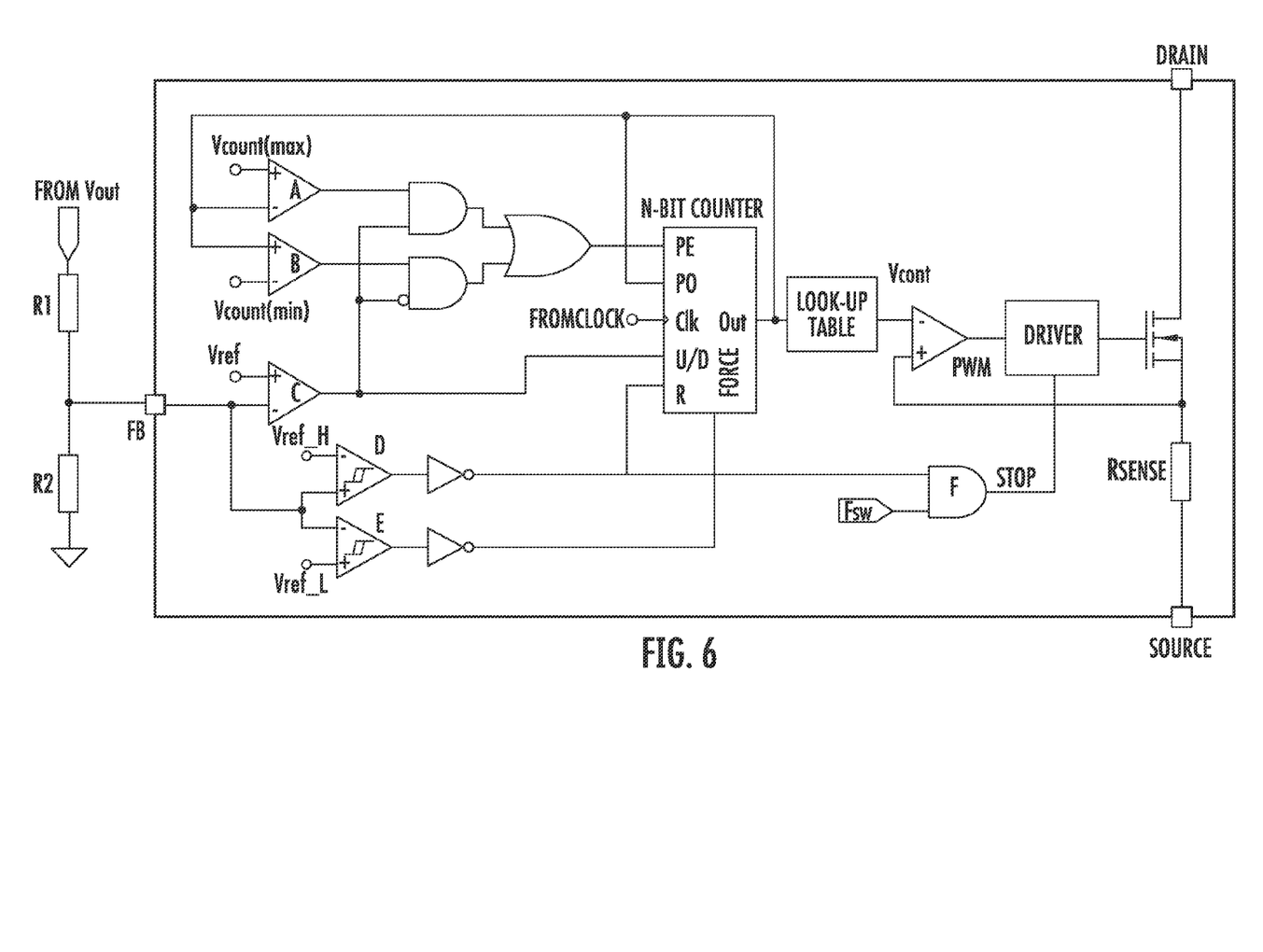
FIG. 6 is a circuit according to an embodiment comprising the accessory logic circuit for limiting over-shoot and under-shoot of the output voltage, according to the present invention.

Referring to FIG. 6, a possible and non-limiting embodiment of this logic circuitry is realized through a hysteresis comparator D, that may reset the counter (acting on the dedicated pin R) and disable the driver through the AND gate, to the second input of which the switching frequency signal Fsw of the WM system is applied, when the voltage on the pin FB surpasses, for example, by 3%, the Vref value, and may enable it when on the same pin a voltage value equal to Vref is restored.

During the phases in which the output load increases, the accessory logic may force the counter to the maximum counting value, forcing by consequence the system at the maximum clamp current. This may occur as soon as the voltage on the pin FB (fraction of Vout) may diminish in respect to the reference Vref by a percentage definable in an arbitrary fashion depending on the output undershoot considered acceptable, for example a predefined value VREF_L in a design phase.

Referring to FIG. 6, a possible and non-limiting embodiment of this logic circuitry is obtained by the hysteresis comparator E, that allows to force the counter at the maximum counting value by acting on the dedicated pin Force of the counter, when the voltage on the pin FB decreases for example by 3% of the value Vref, delaying the control on the same counter when on the same pin a voltage value equal to Vref is again present.

Figure 7:
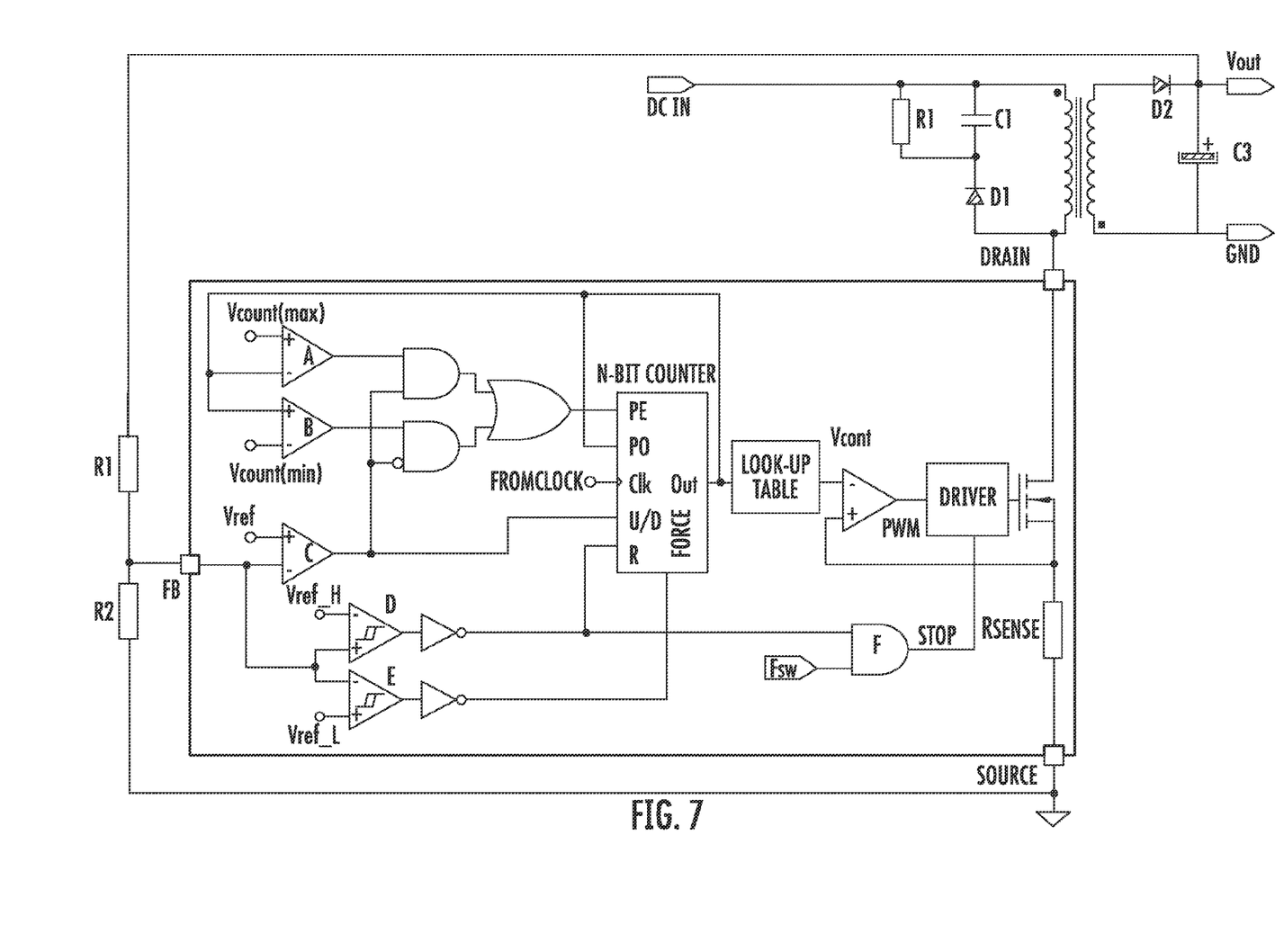
FIG. 7 is a circuit diagram of a non-insulated flyback converter in which the effectiveness of the current control technique has been tested, according to the present invention.
Figure 8:
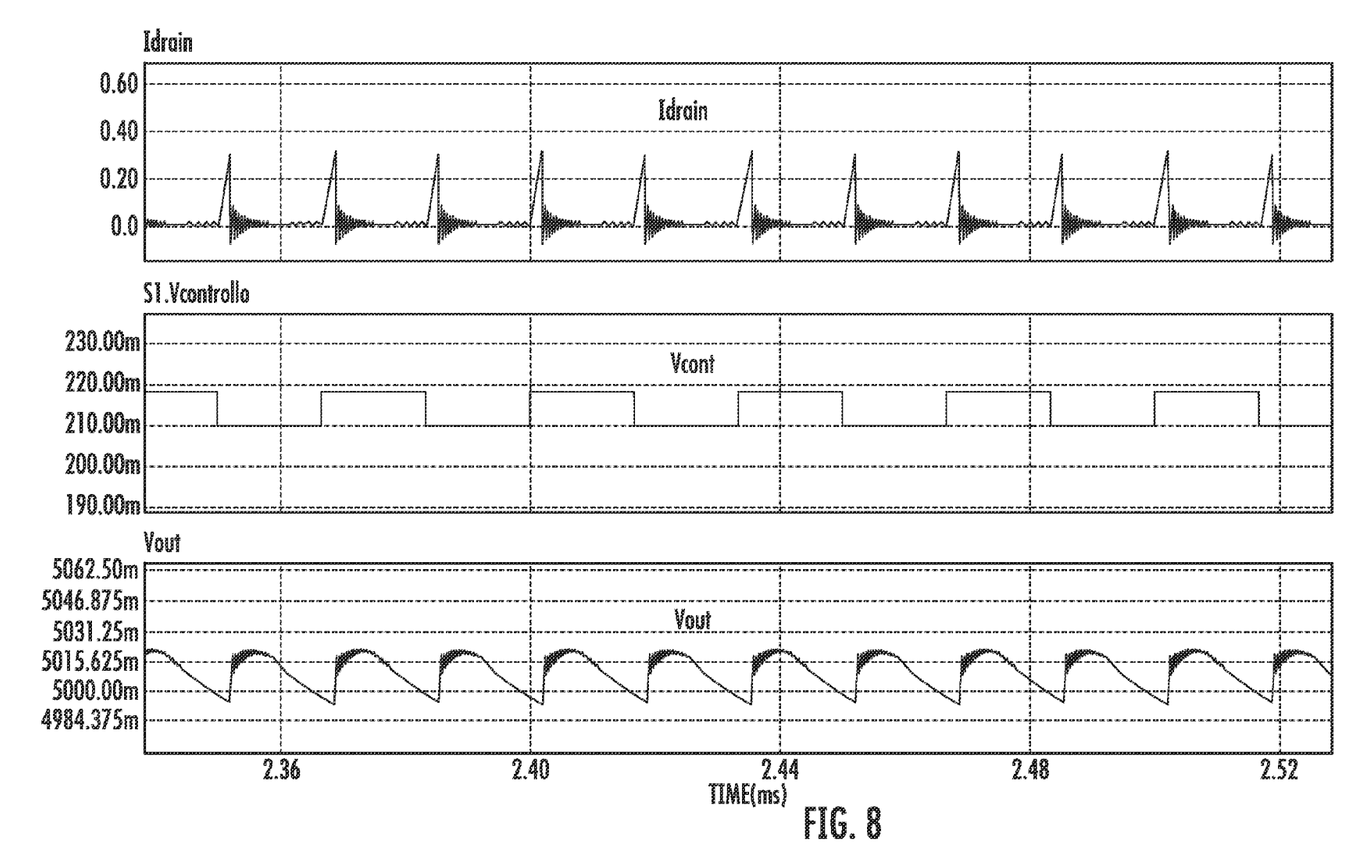
FIG. 8 shows a simulation of the waveforms of the circuits of FIG. 6 in steady state conditions, according to the present invention.
Figure 9:
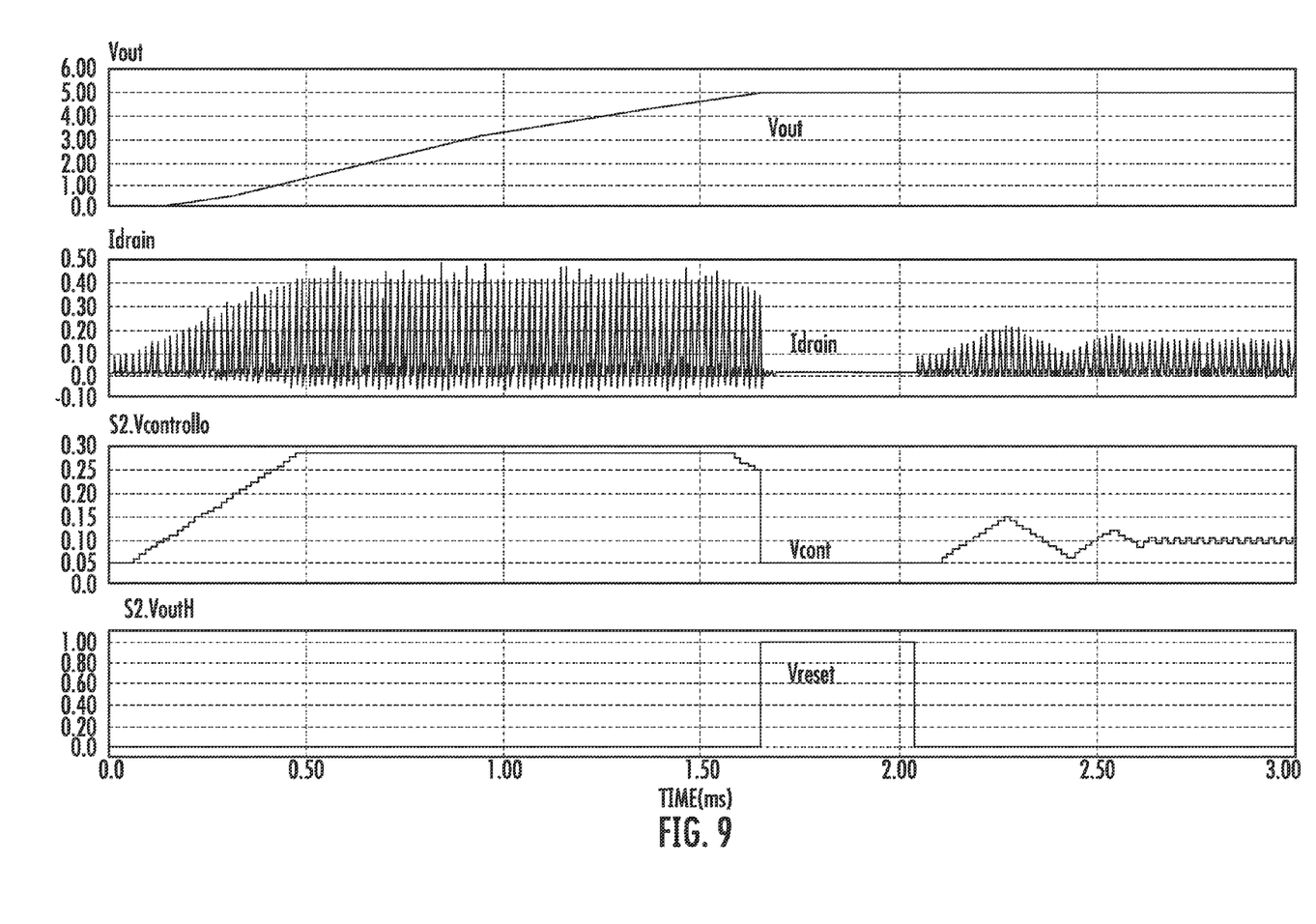
FIG. 9 shows a simulation of the typical waveforms of the circuits of FIG. 7 at the start up of the supply, according to the present invention.
Figure 10:
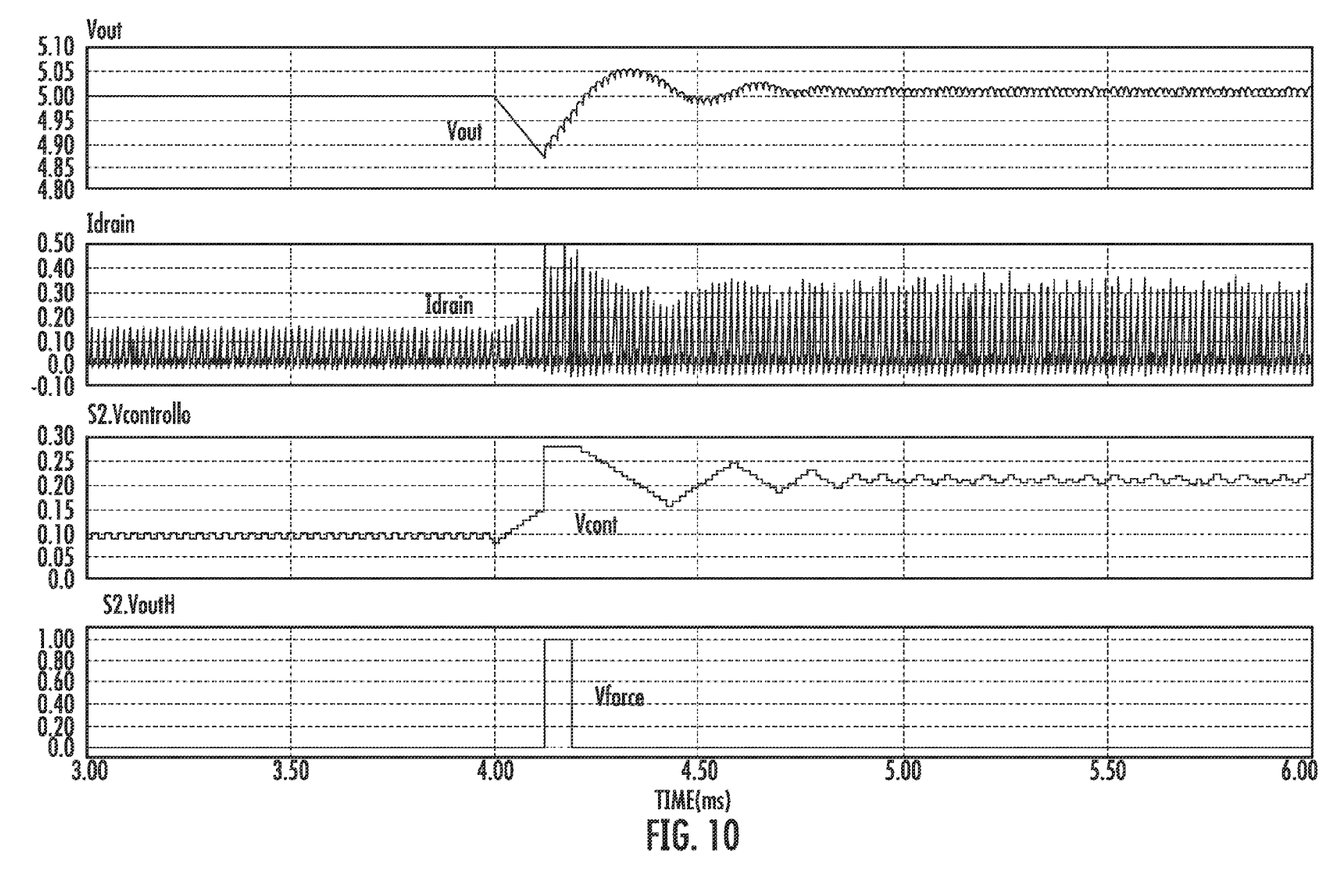
FIG. 10 shows a simulation of the typical waveforms of the circuits of FIG. 7, during a variation of the output load, according to the present invention.

In order to show the validity of the proposed approach, simulations have been carried out, by implementing the proposed control in a non isolated flyback converter. The choice of the present disclosure is not limiting, because the control may be inserted in any circuit topology. Moreover, a look-up table as in Table 1 has been used. The used simulation scheme is shown in FIG. 7. The results of the tests are shown in FIGS. 8, 9 and 10, in steady-state conditions and during load transients.

That which is claimed:

1. A method of controlling an output voltage of a pulse width modulation (PWM) converter with a PWM signal driving a power switch of the converter, the method comprising:
   using a comparator to compare a reference voltage with a scaled output voltage of the converter;
   incrementing or decrementing an up/down counter at each pulse of a clock signal applied to the counter depending on a state of the comparator; and
   controlling a PWM comparator to generate the PWM signal with a control voltage selected from a look-up table using a value of the counter.

2. The method of claim 1 wherein the look-up table stores data corresponding with values of the counter and values of a voltage on an input of the PWM comparator for generating the PWM signal.

3. The method of claim 1 further comprising maintaining the value of the counter when an increment or decrement that would exceed at least one of first and second thresholds for the counter.

4. The method of claim 3 wherein the first threshold comprises a maximum threshold; and wherein the second threshold comprises a minimum threshold.

5. A circuit for controlling an output voltage of a pulse width modulation (PWM) converter, the circuit comprising:
   a comparator configured to have a first input connected to a reference voltage and a second input connected to a scaled output voltage of the converter;
   a resettable up/down N-bit counter configured to have a control up/down input connected to an output of said comparator for incrementing or decrementing a value of said counter depending on a state of the output of said comparator at each leading edge of a clock signal applied to a clock input of said counter;

a PWM comparator configured to generate a PWM signal; and a look-up table circuit configured to store data corresponding to values of said counter and voltage values of the second input of said comparator, and comprising
- a selection input configured to be connected to an output of said counter, and
- an output configured to apply to an input of said PWM comparator a modulation control voltage corresponding to the value selected by said counter.

6. The circuit of claim 5 further comprising a first combination logic circuit configured to:
- receive the output of said counter;
- set values of a first counting value and of a second counting value; and
- set a preset input and an enabling preset input of said counter based upon a current status of the converter.

7. The circuit of claim 6 wherein the first counting value comprises a minimum counting value; and wherein the second counting value comprises a maximum counting value.

8. The circuit of claim 6 further comprising a second combination logic circuit configured to limit overshoots of the output voltage at a start-up and abrupt load variations and comprising:
- a first hysteresis comparator being configured to receive the scaled output voltage of the converter and a first threshold;
- a second hysteresis comparator being configured to receive the scaled output voltage of the converter and a second threshold; and
- a logic AND gate being configured to disable a driving stage of a power switch of the converter and having a first input configured to receive a switching frequency signal of the PWM converter;
- said first hysteresis comparator having an output configured to be connected to a reset input of said counter and to a second input of said logic AND gate;
- the output of said first hysteresis comparator being configured to reset said counter, to disable the driving stage when the scaled output voltage of the converter exceeds the first threshold, and to re-enable the driving stage when the scaled output voltage of the converter equals the reference voltage;
- said second hysteresis comparator having an output configured to be connected to a threshold inducing input of said counter for forcing said counter to the second counting value when the scaled output voltage of the converter decreases below the second threshold as long as the scaled output voltage of the converter equals the reference voltage.

9. The circuit of claim 7 wherein the first threshold is greater than the reference voltage; and wherein the second threshold is less than the reference voltage.

10. A pulse width modulation (PWM) converter:
- a comparator configured to receive a reference voltage and a scaled output voltage;
- a counter configured to have a control up/down input connected to an output of said comparator for incrementing or decrementing a value of said counter depending on a state of the output of the comparator;
- a PWM comparator configured to generate a PWM signal; and
- a look-up table circuit configured to store data corresponding to values of said counter and voltage values for the scaled output voltage of the converter, said look-up table circuit having
  - a selection input configured receive an output of said counter, and
  - an output configured to be coupled to an input of said PWM comparator and to output a modulation control voltage corresponding to the value selected by said counter.

11. The PWM converter of claim 10 further comprising a first combination logic circuit configured to:
- receive the output of said counter;
- set values of a first counting value and of a second counting value; and
- set a preset input and an enabling preset input of said counter based upon a current status of the converter.

12. The PWM converter of claim 11 wherein the first counting value comprises a minimum counting value; and wherein the second counting value comprises a maximum counting value.

13. The PWM converter of claim 11 further comprising a second combination logic circuit configured to limit overshoots of the output voltage at a start-up and abrupt load variations and comprising:
- a first hysteresis comparator being configured to receive the scaled output voltage of the converter and a first threshold;
- a second hysteresis comparator being configured to receive the scaled output voltage of the converter and a second threshold; and
- a logic AND gate being configured to disable a driving stage of a power switch of the converter and having a first input configured to receive a switching frequency signal of the PWM converter;
- said first hysteresis comparator having an output configured to be connected to a reset input of said counter and to a second input of said logic AND gate;
- the output of said first hysteresis comparator being configured to reset said counter, to disable the driving stage when the scaled output voltage of the converter exceeds the first threshold, and to re-enable the driving stage when the scaled output voltage of the converter equals the reference voltage;
- said second hysteresis comparator having an output configured to be connected to a threshold inducing input of said counter for forcing said counter to the second counting value when the scaled output voltage of the converter decreases below the second threshold as long as the scaled output voltage of the converter equals the reference voltage.

14. The PWM converter of claim 12 wherein the first threshold is greater than the reference voltage; and wherein the second threshold is less than the reference voltage.

* * * * *